US010038481B2

(12) United States Patent
Huang et al.

(10) Patent No.: US 10,038,481 B2
(45) Date of Patent: Jul. 31, 2018

(54) MULTI-ANTENNA TRANSMISSION METHOD, TERMINAL AND BASE STATION

(71) Applicant: ZTE CORPORATION, Shenzhen, Guangdong Province (CN)

(72) Inventors: Chen Huang, Shenzhen (CN); Yajun Zhao, Shenzhen (CN); Linmei Mo, Shenzhen (CN); Hanqing Xu, Shenzhen (CN); Baoyu Sun, Shenzhen (CN); Yujie Li, Shenzhen (CN); Hongfeng Qin, Shenzhen (CN); Guofeng Chen, Shenzhen (CN); Hongfeng Yuan, Shenzhen (CN); Xin Zhang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 446 days.

(21) Appl. No.: 14/655,731

(22) PCT Filed: Aug. 14, 2013

(86) PCT No.: PCT/CN2013/081467
§ 371 (c)(1),
(2) Date: Jul. 24, 2015

(87) PCT Pub. No.: WO2013/185733
PCT Pub. Date: Dec. 19, 2013

(65) Prior Publication Data
US 2015/0381246 A1  Dec. 31, 2015

(30) Foreign Application Priority Data
Dec. 28, 2012 (CN) .......................... 2012 1 0587152

(51) Int. Cl.
H04B 7/0456 (2017.01)
H04B 7/06 (2006.01)
(Continued)

(52) U.S. Cl.
CPC ......... *H04B 7/0456* (2013.01); *H04B 7/0486* (2013.01); *H04B 7/0617* (2013.01);
(Continued)

(58) Field of Classification Search
CPC .. H04B 7/0456; H04B 7/0486; H04B 7/0617; H04W 72/042; H04W 74/004; H04W 88/08
See application file for complete search history.

(56) References Cited

U.S. PATENT DOCUMENTS 8,380,135 B2 * 2/2013 Ko ....................... H04B 7/0691
455/550.1
2009/0262695 A1 * 10/2009 Chen ..................... H04L 5/0053
370/329
(Continued)

FOREIGN PATENT DOCUMENTS

CN    101626264 A    1/2010
CN    101778065 A    7/2010
(Continued)

*Primary Examiner* — Christopher Crutchfield
*Assistant Examiner* — Tito Pham
(74) *Attorney, Agent, or Firm* — Ling Wu; Stephen Yang; Ling and Yang Intellectual Property

(57) ABSTRACT

Disclosed are a multi-antenna transmission method, a terminal and a base station, wherein, an eNB sends a UE a SRS transmission mode including new SRS transmission port information and/or a signaling for instructing the UE to perform antenna group alternate transmission as well as a control signaling required by the SRS transmission mode; the UE transmits a SRS using the abovementioned SRS transmission mode, and the eNB estimates a channel infor- (Continued)

mation according to the SRS and calculates and transmits a precoding matrix.

14 Claims, 1 Drawing Sheet

(51) Int. Cl.
*H04W 72/04* (2009.01)
*H04W 74/00* (2009.01)
*H04W 88/08* (2009.01)

(52) U.S. Cl.
CPC ....... *H04W 72/042* (2013.01); *H04W 74/004* (2013.01); *H04W 88/08* (2013.01)

(56) References Cited

U.S. PATENT DOCUMENTS

| | | |
|---|---|---|
| 2011/0310818 A1 | 12/2011 | Lin et al. |
| 2012/0039273 A1 | 2/2012 | Nam et al. |
| 2012/0128088 A1* | 5/2012 | Ko ........................ H04B 7/0465 375/260 |
| 2013/0265978 A1* | 10/2013 | Noh ....................... H04L 5/0051 370/329 |
| 2016/0119762 A1* | 4/2016 | Zhu ........................ H04W 76/28 370/312 |

FOREIGN PATENT DOCUMENTS

| | | |
|---|---|---|
| CN | 101841357 A | 9/2010 |
| CN | 102185642 A | 9/2011 |
| CN | 102340463 A | 2/2012 |
| KR | 20110119502 A | 11/2011 |
| WO | 2009152696 A1 | 12/2009 |
| WO | WO2011153890 A1 | 12/2011 |

* cited by examiner

MULTI-ANTENNA TRANSMISSION METHOD, TERMINAL AND BASE STATION

TECHNICAL FIELD

The present document relates to the field of communications, and more particularly, to a multi-antenna transmission method, a terminal and a base station.

BACKGROUND OF THE RELATED ART

The Multiple-Input Multiple-Out-put (referred to as MIMO) pre-coding technology is divided into pre-coding based on codebook and pre-coding not based on codebook. Comparatively speaking, the pre-coding not based on codebook can match the channel better and improve the link performance. The beamforming technology used in the Long Term Evolution (referred to as LTE) Time Division Duplexing (referred to as TDD) system is a pre-coding technique not based on codebook.

The beamforming estimates an airspace channel on which received signals propagate to obtain beamforming reception/transmission weighting value, and during a receiving/transmitting process, the input and output signals of each antenna in the array are weighted to achieve signal beamforming reception/transmission.

The LTE TDD mode uses the time division duplex mode, wherein uplink and downlink channels occupy the same frequency resource and have essential channel reciprocity, and it is very suitable for using the beamforming technique to improve the downlink performance. The basic operating procedure of downlink beamforming in the LTE TDD system is: first, an evolved Node B (eNodeB or eNB) estimates to obtain an uplink channel according to a Sounding Reference Signal (referred to as SRS) or Demodulation Reference signal (referred to as DMRS) transmitted in the uplink, and obtains the equivalent downlink channel according to the channel reciprocity, the eNB performs a downlink transmission beamforming vector estimation according to the equivalent downlink channel. Finally, the eNB uses the estimated beamforming vector to perform a downlink transmission, and performs the same beamforming on transmitted data and the UE-specific reference signals (UE-Specific RS). At the receiving end, a user equipment (referred to as UE) uses the UE-specific reference signal for channel estimation to obtain the equivalent channel, thus recovering the downlink transmitted data.

The Long Term Evolution advanced (LTE-A) R10 supports uplink MIMO (UL-MIMO) and downlink MIMO (DL MIMO), and supports up to four SRS port transmission in the uplink and up to eight antenna reception in the downlink at the UE side. When the number of the UE's reception antennas is greater than the number of SRS transmission ports, the eNB using the SRS or DMRS transmitted in the uplink can only obtain downlink radio channels between some but not all of the UE's reception antennas and the base station transmission antennas; in the LTE, when the number of UE's transmission antennas is 1, in order to better support the beamforming based on the channel reciprocity in the TDD mode, the method for switching the UE's transmission antennas can be used to support two antennas alternately transmitting the SRS. However, when the number of downlink MIMO configuration ports is greater than 2, the scheme cannot make the eNB have full access to the radio channels between the UE's antennas and the base station antennas. Because the existing schemes cannot obtain the downlink radio channels between all the UE's reception antennas and the base station transmission antennas, there will be an impact on the accuracy of using the channel reciprocity to calculate the beamforming weight value of the downlink MIMO, so that the system performance degrades.

In addition, when the number of antennas which can be used by the UE for uplink transmission is greater than the number of SRS transmission ports, only through SRS signals transmitted by the SRS transmission ports, the eNB is hard to obtain conditions of radio channels completely from all the UE's antennas to the eNB, and cannot transmit a physical uplink shared channel (PUSCH) with an optimal antenna or antenna group to obtain an optimal uplink transmission performance.

SUMMARY OF THE INVENTION

The embodiment of the present invention provides a multi-antenna transmission method, a terminal and a base station to solve the problem in the related art that, the downlink pre-coding calculated by the eNB according to the uplink channel matrix cannot match the radio channels between all the UE's antennas and the base station antennas when the number of UE's reception antennas is greater than the number of SRS transmission ports and the number of downlink configuration ports is greater than 2, as well as the problem that the eNB is hard to obtain conditions of radio channels from all the UE's antennas to the eNodeB completely when the number of antennas which can be used by the UE for transmission is greater than the number of SRS transmission ports, and cannot make the PUSCH transmitted through the optimal antenna or antenna group.

A multi-antenna signal transmission method according to a sounding reference signal provided in the present document comprises:

an evolved Node B (eNodeB) sending a user equipment (UE) a SRS transmission mode as well as a control signaling required by the SRS transmission mode, the SRS transmission mode comprising the UE's new SRS transmission port information determined according to the maximum number of UE's reception antennas or the maximum number of antennas which can be used for transmission and/or a signaling used for instructing the UE to perform an antenna group alternate transmission;

the eNodeB receiving SRS sent by the UE using the SRS transmission mode according to the control signaling, and the eNodeB estimating channel information between the eNodeB and the UE according to the SRS;

the eNodeB performing a downlink multiple-input multiple-output (MIMO) precoding matrix calculation and transmission according to the channel information; or the eNodeB performing a PUSCH antenna group selection and an uplink MIMO precoding matrix calculation and transmission according to the channel information and the UE performing an uplink MIMO signal transmission in a PUSCH antenna group selected by the eNodeB.

The abovementioned method may further have the following feature:

when the purpose of the UE transmitting the SRS is for a downlink beamforming of the eNodeB, preferably, the number of new SRS transmission ports is determined according to the maximum number of the UE's reception antennas;

when the purpose of the UE transmitting the SRS is for the UE's PUSCH antenna group selection and uplink MIMO signal transmission, preferably, the number of new SRS transmission ports is determined according to the maximum number of antennas which can be used by the UE for transmission.

The abovementioned method may further have the following feature:

the method for determining the number of new SRS transmission ports according to the maximum number of the UE's reception antennas is to make the sum of the number of the new SRS transmission ports and the number of LTE-A standard SRS transmission ports be the maximum number of the UE's reception antennas;

the method for determining the number of new SRS transmission ports according to the maximum number of antennas which can be used by the UE for transmission is to make the sum of the number of new SRS transmission ports and the number of LTE-A standard SRS transmission ports be the maximum number of antennas which can be used by the UE for transmission.

The abovementioned method may further have the following feature:

the new SRS transmission ports are orthogonal with the UE's LTE-A standard SRS transmission ports through time division, frequency division, or code division.

The abovementioned method may further have the following feature:

when the SRS transmission mode comprises a signaling which is used to instruct the UE to perform an antenna group alternate transmission, it further comprises a signaling for instructing an antenna grouping principle, and the antenna grouping principle is grouping antennas whose antenna correlation is greater than or equal to a standard correlation into a same antenna group.

The abovementioned method may further have the following feature:

when the number of antenna groups which are used for performing the antenna group alternate transmission is more than one, the numbers of times of various antenna groups transmitting the SRS in one SRS transmission cycle are the same.

The abovementioned method may further have the following feature:

when the number of antenna groups which are used for performing the antenna group alternate transmission is 2, the eNodeB uses SRS antenna port serial number in a SRS antenna alternate transmission rule to instruct antenna group serial numbers.

The abovementioned method may further have the following feature:

the antenna group division method is determined according to whether the UE needs to perform a PUSCH antenna group selection and transmission or not, and when the UE needs to perform the PUSCH antenna group selection, preferably, antennas whose antenna correlation is greater than or equal to the standard correlation are grouped in the same antenna group, and when the UE does not need to perform the PUSCH antenna group selection, preferably, antennas whose antenna correlation is less than the standard correlation are grouped in the same antenna group.

The abovementioned method may further have the following feature:

when the SRS transmission mode comprises the new SRS transmission ports, after the eNode B receives the SRS, a corresponding channel estimation matrix of each LTE-A standard SRS transmission port number is obtained in accordance with an arrangement of UE's LTE-A standard SRS port number, and a corresponding channel estimation matrix of each new SRS transmission port number is obtained in accordance with an arrangement of UE's new SRS port number, and the two channel estimation matrixes are arranged into one matrix as the channel estimation matrix of all the UE's SRS transmission ports, and the channel information is estimated according to the matrix;

when the SRS transmission mode comprises a signaling for instructing the UE to perform an antenna group alternate transmission, after receiving the SRS, the eNodeB obtains channel estimation matrixes of the SRS transmission ports of respective antenna groups in accordance with an arrangement of UE's SRS transmission port number, arranges the channel estimation matrixes of all the antenna groups in accordance with an arrangement of antenna group serial number into a matrix as the channel estimation matrix of all the UE's SRS transmission ports, and estimates the channel information according to this matrix.

The present document further provides a user equipment (UE), and the UE comprises a receiving module, an analysis processing module and a transmitting module;

the receiving module is configured to: receive a SRS transmission mode as well as a control signaling required by the SRS transmission mode from an eNodeB, the SRS transmission mode comprises the UE's new SRS transmission port information determined according to the maximum number of the UE's reception antennas or the maximum number of antennas which can be used by the UE for transmission and/or a signaling for instructing the UE to perform an antenna group alternate transmission; and is further used to receive a downlink MIMO precoding matrix signal or receive a PUSCH antenna group instructed by the eNodeB as well as an uplink MIMO pre-coding matrix signal;

the analysis processing module is configured to: analyze the control signaling and the SRS transmission mode;

the transmitting module is configured to: send the eNodeB the maximum number of the UE's reception antennas and/or the maximum number of antennas which can be used for transmission, and also used to use the SRS transmission mode to transmit the SRS according to the control signaling; and is further used to perform an uplink MIMO signal transmission in a PUSCH antenna group selected by the eNodeB.

The abovementioned UE may further have the following feature:

the transmitting module is configured to: when the number of antenna groups used for performing the antenna group alternate transmission is greater than 1, transmit the SRS for the same number of times in each antenna group in one SRS transmission cycle.

The abovementioned UE may further have the following feature:

the analysis processing module is further configured to: determine an antenna group division method according to whether the UE needs to perform a PUSCH antenna group selection and transmission or not, and when there is a need to perform the PUSCH antenna group selection, preferably, group antennas whose antenna correlation is greater than or equal to a standard correlation in the same antenna group, and when there is no need to perform the PUSCH antenna group selection, preferably, group antennas whose antenna correlation is less than a standard correlation into the same antenna group.

The embodiment of the present invention further provides a base station, and the base station comprises a receiving module, an analysis processing module and a transmitting module;

the analysis processing module is configured to: determine the UE's new SRS transmission port information according to the maximum number of the UE's reception antennas or the maximum number of antennas which can be used for transmission, and is further used to determine a signaling for instructing the UE to perform the antenna group alternate transmission; and further used to estimate channel information between the base station and the UE according to the SRS; and is further used to perform a downlink MIMO pre-coding matrix calculation according to the channel information; and is further used to perform a PUSCH antenna group selection and an uplink MIMO pre-coding matrix calculation according to the channel information;

the transmitting module is configured to: send the UE a SRS transmission mode and a control signaling required by the SRS transmission mode, wherein the SRS transmission mode comprises the new SRS transmission port information and/or a signaling used for instructing the UE to perform an antenna group alternate transmission; and further used to transmit a downlink MIMO precoding matrix to the UE or transmit a PUSCH antenna group selection result and an uplink MIMO pre-coding matrix to the UE;

the receiving module is further configured to: receive a SRS transmitted by the UE.

The abovementioned base station may further have the following feature:

the analysis processing module comprises a SRS transmission port determining unit;

the SRS transmission port determining unit is configured to: when the purpose of the UE transmitting the SRS is for a downlink beamforming of the eNodeB, preferably, determine the number of new SRS transmission ports according to the maximum number of the UE's reception antennas: and is further used to, when the purpose of the UE transmitting the SRS is for the UE's PUSCH antenna group selection and uplink MIMO signal transmission, preferably, determine the number of the new SRS transmission ports according to the maximum number of antennas which can be used by the UE for transmission.

The abovementioned base station may further have the following feature:

the SRS transmission port determining unit is configured to: when determining the number of new SRS transmission ports according to the maximum number of the UE's reception antennas, make the sum of the number of the new SRS transmission ports and the number of long term evolution advanced (LTE-A) standard SRS transmission ports be the maximum number of the UE's reception antennas; further used to make the sum of the number of the new SRS transmission ports and the number of LTE-A standard SRS transmission ports be the maximum number of antennas which can be used by the UE for transmission when determining the number of new SRS transmission ports according to the maximum number of antennas which can be used by the UE for transmission.

The abovementioned base station may further have the following feature:

the SRS transmission port determining unit is further configured to: set the new SRS transmission ports to be orthogonal with the UE's LTE-A standard SRS transmission ports through time division, frequency division, or code division.

The abovementioned base station may further have the following feature:

when the SRS transmission mode comprises a signaling for instructing the UE to perform an antenna group alternate transmission, it further comprises a signaling for instructing an antenna grouping principle, and the antenna grouping principle is grouping antennas whose antenna correlation is greater than or equal to a standard correlation into the same antenna group.

The abovementioned base station may further have the following feature:

the analysis processing module further comprises an antenna group alternate transmission setting unit, the antenna group alternate transmission setting unit is configured to: perform a alternate transmission rule of SRS antenna port during the antenna alternate transmission, and when the number of antenna groups used for performing the antenna group alternate transmission is 2, use SRS antenna port serial number in a SRS antenna alternate transmission rule to instruct serial numbers of antenna group.

The abovementioned base station may further have the following feature:

the analysis processing module further comprises a channel estimation unit;

the channel estimation unit is configured to: obtain a corresponding channel estimation matrix of each LTE-A standard SRS transmission port number according to an arrangement of UE's LTE-A standard SRS port number, obtain a corresponding channel estimation matrix of each new SRS transmission port number according to an arrangement of UE's new SRS port number, and arrange the two channel estimation matrixes into one matrix as the channel estimation matrix of all the UE's SRS transmission ports, and estimate the channel information according to the matrix.

The abovementioned base station may further have the following feature:

the analysis processing module further comprises a channel estimation unit;

the channel estimation unit is configured to: obtain channel estimation matrixes of the SRS transmission ports of respective antenna groups according to an arrangement of UE's SRS transmission port number, arrange the channel estimation matrixes of all the antenna groups into one matrix as the channel estimation matrix of all the UE's SRS transmission ports in accordance with an arrangement of antenna group serial number, and estimate the channel information according to the matrix.

The embodiment of the present invention can be used to overcome the problem that a downlink pre-coding calculated by the eNode B according to the uplink channel matrix cannot match radio channels between all the UE's antennas and the base station antennas in the LTE-A TDD mode when the number of the UE's reception antennas is greater than the number of transmission ports and the number of downlink configuration ports is greater than 2; in addition, it can also overcome the problem that the eNodeB is hard to obtain conditions of radio channels completely from all the UE's antennas to the eNode in the LTE/LTE-A system when the number of antennas which can be used by the UE for transmission is greater than the number of transmission ports, so that the PUSCH cannot be transmitted through the optimal antenna or antenna group. If the beamforming method is used, it can further overcome the quantization error exists in a codebook, precisely match the channels, and improve the downlink performance.

PREFERRED EMBODIMENTS OF THE INVENTION

Hereinafter, in conjunction with the accompanying drawings, the embodiments of the present invention will be described in detail. It should be noted that, in the case of no conflict, embodiments and features in the embodiments in the present application can be combined randomly with each other.

Figure 1:
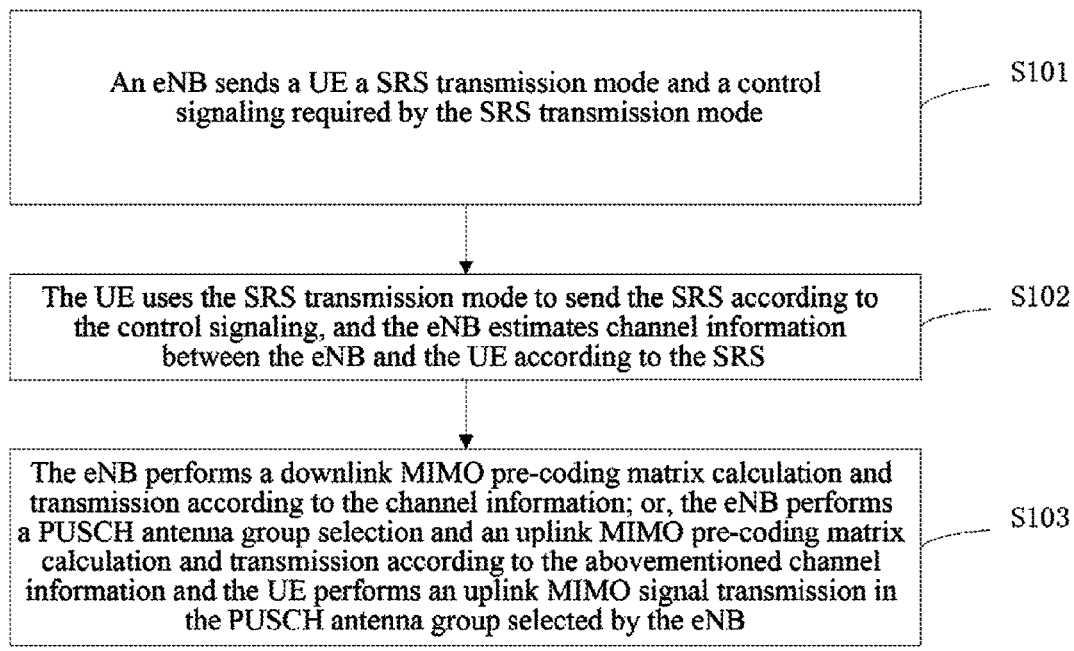
FIG. 1 is a flow chart of a multi-antenna signal transmission method in accordance with an embodiment of the present invention.

As shown in FIG. 1, the multi-antenna signal transmission method according to the sounding reference signal in accordance with an embodiment of the present invention comprises steps S101 to S103.

In step S101, an eNB sends a UE a SRS transmission mode and a control signaling required by the SRS transmission mode, and the SRS transmission mode comprises the UE's new SRS transmission port information and/or a signaling for instructing the UE to perform an antenna group alternate transmission according to the maximum number of the UE's reception antennas or the maximum number of antennas which can be used for transmission;

when the eNB sends the control signaling, a RRC signaling can be used for configuration, and a DCI signaling can also be used to perform a dynamic activation.

In step S102, the UE uses the abovementioned SRS transmission mode to send the SRS according to the abovementioned control signaling, and the eNB estimates channel information between the eNB and the UE according to the SRS;

in step S103, the abovementioned eNB performs a downlink MIMO pre-coding matrix calculation and transmission according to the abovementioned channel information; or, the abovementioned eNB performs a physical uplink shared channel (PUSCH) antenna group selection and an uplink MIMO pre-coding matrix calculation and transmission according to the abovementioned channel information and the UE performs an uplink MIMO signal transmission in the PUSCH antenna group selected by the abovementioned eNB.

In the step S101 of the present method, the eNB can add a SRS transmission mode, and the added SRS transmission mode comprises at least one of the following methods:

the first method: adding the UE's SRS transmission port information.

Currently, the LTE-A R10 scheme supports up to four antenna ports transmitting the SRS, and the number of SRS transmission ports is limited to the PUSCH transmission mode and the number of spatial multiplexing layers, in order to obtain uplink channels between all the antennas which can be used by the UE for transmission and the base station antennas, it also needs to add more antenna port transmission modes for the SRS, and the number of SRS configuration transmission ports is not limited to the PUSCH transmission mode and the number of spatial multiplexing layers.

The eNB determines the UE's new SRS transmission port information according to the maximum number of the UE's reception antennas and the maximum number of antennas which can be used for transmission. The maximum number of the UE's reception antennas and the maximum number of antennas which can be used for transmission may have been known by the eNB, or acquiesced by the both parties, or carried in the information reported by the UE to the eNB.

When determining the number of SRS transmission ports, the eNB needs to combine with the number of reception antennas reported by the UE and the number of antennas which can be used for transmission. When the purpose of the UE transmitting the SRS is for the downlink beamforming of the eNB, the number of new SRS transmission ports is determined according to the maximum number of the UE's reception antennas, preferably, the sum of the number of new SRS transmission ports determined by the eNB and the number of LTE-A standard SRS transmission ports is the maximum number of the UE's reception antennas. When the purpose of the UE transmitting the SRS is for the UE's PUSCH antenna group selection and uplink MIMO signal transmission, the number of new SRS transmission ports is determined according to the maximum number of antennas which can be used by the UE for transmission, preferably, the sum of the number of new SRS transmission ports determined by the eNB and the number of LTE-A standard SRS transmission ports is the maximum number of antennas which can be used by the UE for transmission; for example, the number of all the UE's SRS transmission ports (including the new SRS transmission ports and the LTE-A standard SRS transmission ports) can be configured as {0,1,2,4, 8, . . . M}, wherein M is the number of antennas which can be used by the UE for uplink transmission.

The UE's new SRS antenna ports are orthogonal with the UE's existing LTE-A standard SRS antenna ends (such as the four antenna ports in the original LTE-A standard) through time division, frequency division, or code division.

Time division: for example, the sub-frame where the new M-4 SRS antenna ports are located has an offset value with the sub-frame of the existing four antenna ports;

frequency division: for example, the new M-4 SRS antenna ports has an offset value with the RB where the existing four antenna ports are located;

code division: for example, the first two antenna ports in the new M-4 SRS antenna ports, for example, the number of new SRS antenna ports is 4, that is, the SRS antenna ports {4,5} and the existing SRS antenna ports {0,1} are in the same sub-carriers, then by distinguishing with different cyclic shifts, the cyclic phase differences between the SRS antenna ports {4,5} and the SRS antenna port {0} are $$2\pi\frac{2}{8} \text{ and } 2\pi\frac{6}{8};$$

the SRS antenna ports {6,7} and the existing SRS antenna ports {2,3} are in the same sub-carriers, then by distinguishing with different cyclic shifts, the cyclic phase differences between the SRS antenna ports {6,7} and the SRS antenna port {2} are $$2\pi\frac{2}{8} \text{ and } 2\pi\frac{6}{8}.$$

The second method, antenna group alternate transmission.

Currently, the number of uplink transmission ports supported in the LTE protocol is 1 and the UE supports the antenna alternate transmission, a signaling can be used to configure the antenna alternate transmission, but there is no concept of antenna group alternate transmission. In order to make that the number of the UE's reception antennas is greater than the number of transmission ports and the number of downlink configuration ports is greater than 2, it is better to obtain downlink channel information through the SRS and the channel reciprocity, it can add the antenna group alternate transmission function and related signaling instruction, instruct the antenna group alternate transmission via a signaling, or use other values of this signaling to instruct the fixed antenna group to transmit.

The number of antenna groups can be the default (for example, it is two by default). After the eNB transmits a signaling which is used to instruct to perform the antenna group alternate transmission, the UE automatically performs grouping according to the default number of antenna groups. The number of antenna groups can also be determined by the eNB and notified to the UE. The eNB can determine the number of antenna groups according to the maximum number of antennas which can be used by the UE for transmission.

Different situations of the UE performing the PUSCH antenna group selection and transmission and not performing the PUSCH antenna group selection and transmission have different requirements on the independence of antennas in the antenna group.

When the UE performs the PUSCH antenna group selection and transmission, preferably, antennas with relative high antenna correlation are grouped into the same antenna group, that is, antennas whose antenna correlation is greater than or equal to the standard correlation are grouped into the same antenna group, to make the antennas between the groups have relatively strong independence, therefore it can make sure that the optimal antenna group is selected for transmission in the subsequent PUSCH antenna group selection and transmission.

When the UE does not perform the PUSCH antenna group selection, preferably, it needs to divide antennas with relatively high antenna correlation into different groups to make antennas within a group have relatively strong independence, so that channels among the antennas during the SRS transmission are more independent, thus obtaining more diversity and multiplexing gain.

Beside of transmitting the signaling for instructing to perform the antenna group alternate transmission, the eNB can further transmit a signaling for instructing the antenna grouping principle, for example, when the bit value of the signaling is "1", it indicates that antennas whose antenna correlation is greater than or equal to the standard correlation are grouped in the same antenna group, when it is "0", it indicates that antennas whose antenna correlation is less than the standard antenna correlation are grouped in the same antenna group.

When the antennas are divided into more than one group, during the antenna group alternate transmission, preferably, the numbers of times of various antenna groups transmitting the SRS within one SRS transmission cycle are the same.

When the antennas are divided into two groups, the antenna group numbers are {0,1}. For example, the number of SRS antenna ports is 4, the number of antennas that can be used for uplink transmission is 8, then the antennas can be divided into two groups, each group has four antennas and the antenna group numbers are {0,1}. The two SRS antenna port group alternate transmission rule can follow the SRS antenna alternate transmission rule in the LTE protocol, or a new SRS antenna port group alternate transmission rule can be added. Preferably, it is proposed that the two SRS antenna port group alternate transmission rule can follow the SRS antenna alternate transmission rule in the LTE protocol, and the SRS antenna port serial numbers in the original SRS antenna alternate transmission rule may also be used to indicate the SRS antenna port group serial numbers, that is, the original SRS antenna port $a^{(n_{SRS})}=0$ also indicates the SRS antenna port group 0, the original SRS antenna port $a^{(n_{SRS})}=1$ also indicates the SRS antenna port group 1.

During the antenna grouping, the UE should consider the impact of the delay and relevance between the antennas and the RF indicator, and try to make antennas whose delay difference and frequency difference are relatively large in different groups.

Preferably, if the eNB has antenna grouping rule instruction, the UE performs the antenna grouping according to the eNodeB's antennas grouping rule instruction. If the eNB does not have an antenna grouping rule instruction, preferably, the antenna grouping is performed according to whether the UE performs the PUSCH antenna group selection and transmission or not.

If the UE needs to perform the PUSCH antenna group selection and transmission, and when the UE performs antenna grouping, preferably, the UE groups antennas with relatively high antenna correlation into one group as many as possible, the antenna grouping is performed according to the eNodeB's antenna grouping rule instruction. For example, when the UE is a dual-polarized antenna, during the antenna grouping, preferably, horizontally polarized antennas and vertically polarized antennas are divided into different groups, for example, when being divided into 2 groups, the vertically polarized antennas are grouped into one group, and the horizontally polarized antennas are grouped into the other group.

If the UE does not need to perform the PUSCH antenna group selection and transmission, during the antenna grouping, preferably, the UE divides antennas with relatively high antenna correlation into different groups to make the antennas within a group have relatively strong independence, such that channels between the antennas during the PUSCH transmission are more independent, thus obtaining more diversity and multiplexing gain. For example, when the UE is a dual-polarized antenna, during the antenna grouping, preferably, horizontally polarized antennas and vertically polarized antennas should be divided in different groups, and when they are divided into 2 groups, the vertically polarized antennas are in one group, and the horizontally polarized antennas are in the other group.

In the step S102 of the present method, the eNB uses the SRS to perform uplink channel estimation on the reference signal transmitted at the corresponding antenna port to obtain an uplink channel estimate value.

For the SRS existing ports, it is to take received signals at the SRS existing ports according to the resource location (radio frame number, subframe number, uplink SC-FDMA symbol serial number, frequency domain subcarrier number), perform channel estimation, and obtain a channel estimation matrix of SRS existing ports according to the arrangement of SRS port number;

For the SRS new ports, it is to take the received signal at the SRS new ports according to the resource location (radio frame number, subframe number, uplink SC-FDMA symbol serial number, frequency domain subcarrier number), perform the channel estimation, and obtain a channel estimation matrix of the SRS new ports according to the arrangement of SRS port number;

then, according to the arrangement of SRS port number, the channel estimation matrix of the SRS existing ports and the channel estimate matrix of the SRS new ports are arranged into a large matrix which comprises channel estimation of all SRS ports.

When using the antenna group alternate transmission, it also needs to obtain a channel estimation matrix of all the transmission antennas.

For the $0^{th}$ antenna group of the SRS, it is to take received signal of the $0^{th}$ antenna group ports of the SRS according to the resource location (radio frame number, subframe number, uplink SC-FDMA symbol serial number, frequency domain subcarrier number), perform the channel estimation, and obtain the channel estimation matrix of the $0^{th}$ antenna group of SRS existing ports in accordance with the arrangement of SRS port number;

for the $1^{st}$ antenna group of the SRS, it is to take received signal of the $1^{st}$ antenna group ports of the SRS according to the resource location (radio frame number, subframe number, uplink SC-FDMA symbol serial number, frequency domain subcarrier number), perform the channel estimation, and obtain the channel estimation matrix of the $1^{st}$ antenna group of SRS existing ports in accordance with the arrangement of SRS port number; the other situations can be obtained accordingly according to the antenna group serial numbers;

then, according to the arrangement of antenna group serial number, channel estimation matrixes of the SRS ports of all the antenna groups are arranged into a large matrix which comprises the channel estimations of the SRS ports of all the antenna groups.

In the step S103 of the present method, the eNB can perform the downlink MIMO pre-coding matrix calculation and transmission according to the channel information.

In the step S103 of the present method, the eNB can also judge the PUSCH uplink antenna group selection and calculate the PUSCH MIMO pre-coding matrix. The eNB notifies the UE of the PUSCH related scheduling information, it needs a new PUSCH antenna group selection signaling; then the UE performs the MIMO transmission on the selected antenna group according to the PUSCH relevant scheduling information, including the PUSCH antenna group selection signaling, sent by the eNode B.

Currently, the LTE protocol supports the PUSCH open-loop and closed-loop antenna alternate transmission, and the open-loop antenna alternate transmission is performed by the UE, and the protocol did not specify it; during the closed-loop antenna alternate transmission, the eNodeB indicates the PUSCH antenna selection ports through the CRC check bit scrambling sequence of the DCI format0:

when the UE transmits antenna selection, the CRC check bit scrambling sequence of the DCI format0

| UE transmits antenna selection | Antenna selection mask $<x_{AS,0}, x_{AS,1}, \ldots, x_{AS,15}>$ |
| --- | --- |
| UE Port 0 | <0, 0, 0, 0, 0, 0, 0, 0, 0, 0, 0, 0, 0, 0, 0, 0> |
| UE Port 1 | <0, 0, 0, 0, 0, 0, 0, 0, 0, 0, 0, 0, 0, 0, 0, 1> |

If the antenna group alternate transmission is supported, it needs to redefine the meaning of the DCI SRS port instruction. When the number of antenna groups is 2, the DCI SRS port indication is redefined as comprising but not limited to the following methods:

the CRC check bit scrambling sequence <0, 0, 0, 0, 0, 0, 0, 0, 0, 0, 0, 0, 0, 0, 0, 0> of the DCI format0 indicates the antenna port group 0, the CRC check bit scrambling sequence <0, 0, 0, 0, 0, 0, 0, 0, 0, 0, 0, 0, 0, 0, 0, 1> of the DCI format 0 indicates the antenna port group 1, and the size of port group N={1,2,4}.

compatible with the original two antenna ports: the CRC check bit scrambling sequence <0, 0, 0, 0, 0, 0, 0, 0, 0, 0, 0, 0, 0, 0, 0, 0> of the DCI format0 indicates the antenna port 0, the CRC check bit scrambling sequence <0, 0, 0, 0, 0, 0, 0, 0, 0, 0, 0, 0, 0, 0, 0, 1> of the DCI format0 indicates the antenna port 1.

The present method can use one of the following methods in a specific implementation:

first, the eNB sends the UE the UE's new SRS transmission port information determined according to the maximum number of the UE's reception antennas or the maximum number of antennas which can be used for transmission, the UE transmits the SRS after adding the SRS transmission ports, and the eNB performs a channel estimation according to the SRS.

Second, the eNB sends the UE a signaling used to instruct the UE to perform the antenna group alternate transmission, and after the UE performs the antenna group alternately transmitting the SRS, the eNB performs the channel estimation according to the SRS.

Third, the eNB sends the UE the UE's new SRS transmission port information determined according to the maximum number of the UE's reception antennas or the maximum number of antennas which can be used for transmission and the signaling used to instruct the UE to perform the antenna group alternate transmission, the UE transmits the SRS after adding the SRS transmission ports and performing the antenna group alternate transmission, and the eNB performs the channel estimation according to the SRS.

Using each of the abovementioned embodiments can solve the problem in the related art that the downlink precoding matrix calculated by the eNB according to the uplink channel matrix cannot match the radio channels between all the UE's antennas and the base station antennas when the number of the UE's reception antennas is greater than the number of transmission ports and the number of downlink configuration ports is greater than 2, as well as the problem that the eNB is hard to completely obtain conditions of radio channels from all the UE's antennas to the eNodeB when the number of antennas which can be used by the UE for transmission is greater than the number of transmission ports, and cannot make the PUSCH transmitted through the optimal antenna or antenna group.

Figure 2:
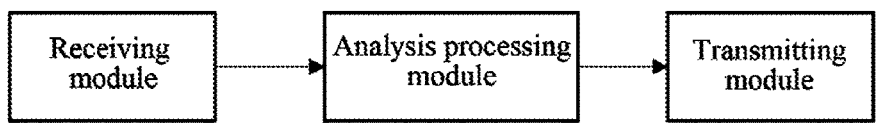
FIG. 2 is a schematic diagram of structures of a user equipment and a base station in accordance with an embodiment of the present invention.

As shown in FIG. 2, the user equipment in the embodiment of the present invention comprises a receiving module, an analysis processing module, and a transmitting module;

the receiving module is configured to: receive a SRS transmission mode and a control signaling which is required by the SRS transmission mode from the eNB, wherein the SRS transmission mode comprises the UE's new SRS transmission port information determined according to the maximum number of the UE's reception antennas or the maximum number of antennas which can be used for transmission and/or a signaling for instructing the UE to perform the antenna group alternate transmission; receive a downlink MIMO precoding matrix signal or receive a PUSCH antenna group indicated by the eNB and an uplink MIMO pre-coding matrix signal;

the analysis processing module is configured to: analyze the control signaling and the SRS transmission mode;

the transmitting module is configured to: send the eNB the maximum number of the UE's reception antennas and/or the maximum number of antennas which can be used for transmission, and use the abovementioned SRS transmission mode to transmit the SRS according to the abovementioned control signaling; and perform the uplink MIMO signal transmission in the PUSCH antenna group selected by the eNB.

Wherein, the transmitting module is configured to: when the number of antenna groups used for performing the antenna group alternate transmission is greater than 1, transmit the SRS in various antenna groups for the same times in one SRS transmission cycle.

Wherein, the analysis processing module is further configured to determine an antenna group division method according to whether the UE needs to perform the PUSCH antenna group selection and transmission or not, and when there is a need to perform the PUSCH antenna group selection, group antennas whose antenna correlation is greater than or equal to a standard correlation into a same antenna group, and when there is no need to perform the PUSCH antenna group selection, group antennas whose antenna correlation is less than the standard correlation into the same antenna group.

As shown in FIG. 2, the base station in the embodiment of the present invention further comprises a receiving module, an analysis processing module, and a transmitting module;

the analysis processing module is configured to determine the UE's new SRS transmission port information according to the maximum number of the UE's reception antennas or the maximum number of antennas which can be used for transmission, determine the signaling for instructing the UE to perform the antenna group alternate transmission; estimate the channel information between the eNB and the UE according to the SRS; and is further used to perform the downlink MIMO pre-coding matrix calculation according to the abovementioned channel information; and perform the PUSCH antenna group selection and the uplink MIMO pre-coding matrix calculation according to the abovementioned channel information;

the transmitting module is configured to send the UE the SRS transmission mode and control signaling required by the SRS transmission mode, and the SRS transmission mode comprises the new SRS transmission port information and/or the signaling used for instructing the UE to perform the antenna group alternate transmission; transmit the downlink MIMO pre-coding matrix to the UE or send the UE the PUSCH antenna group selection result and the uplink MIMO pre-coding matrix;

the receiving module is further configured to: receive the SRS sent by the UE.

Wherein, the analysis processing module comprises a SRS transmission port determining unit;

the SRS transmission port determining unit is configured to: when the purpose of the UE transmitting the SRS is for the downlink beamforming of the eNB, determine the number of new SRS transmission ports according to the maximum number of the UE's reception antennas, preferably, determine the sum of the number of new SRS transmission ports and the LTE-A standard SRS transmission ports is the maximum number of the UE's reception antennas; when the purpose of the UE transmitting the SRS is for the UE's PUSCH antenna group selection and uplink MIMO signal transmission, determine the number of the new SRS transmission ports according to the maximum number of antennas which can be used by the UE for transmission, preferably, determine that the sum of the number of the new SRS transmission ports and the number of LTE-A standard SRS transmission ports is the maximum number of antennas which can be used by the UE for transmission.

The SRS transmission port determining unit is further configured to set the new SRS transmission ports to be orthogonal with the UE's LTE-A standard SRS transmission ports through time division, frequency division, or code division.

When the SRS transmission mode comprises a signaling for instructing the UE to perform the antenna group alternate transmission, it further comprises a signaling for indicating the antenna grouping principle, and the antenna grouping principle is grouping antennas whose antenna correlation is greater than or equal to the standard correlation in the same antenna group.

Wherein, the analysis processing module further comprises an antenna group alternate transmission setting unit which is configured to perform the alternate transmission rule of SRS antenna port during the antenna alternate transmission, and when the number of antenna groups used for performing the antenna group alternate transmission is 2, use the SRS antenna port serial number in the SRS antenna alternate transmission rule to indicate the antenna group serial numbers.

Wherein, the analysis processing module further comprises a channel estimation unit which is configured to obtain a corresponding channel estimation matrix of each LTE-A standard SRS transmission port number according to the arrangement of UE's LTE-A standard SRS port number, obtain a corresponding channel estimation matrix of each new SRS transmission port number according to the arrangement of UE's new SRS port number, and arrange the two channel estimation matrixes into one matrix as the channel estimation matrix of all the UE's SRS transmission ports, and estimate the channel information according to the matrix.

The channel estimation unit is further configured to: obtain the channel estimation matrix of the SRS transmission ports of each antenna group according to the arrangement of UE's SRS transmission port number, arrange the channel estimation matrixes of all the antenna groups into one matrix as the channel estimation matrix of all the UE's SRS transmission ports in accordance with the arrangement of antenna group serial number, and estimate the channel information in accordance with this matrix.

Of course, the present document may have a variety of other embodiments, and without departing from the spirit and essence of the present document those skilled in the art can make various corresponding changes and modifications according to the present document, and these corresponding changes and modifications should belong to the protection scope of appended claims of the present document.

Those ordinarily skilled in the art can understand that all or some steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The embodiment of the present invention can overcome the problem that a downlink pre-coding calculated by the eNode B according to the uplink channel matrix cannot match radio channels between all the UE's antennas and the base station antennas in the LTE-A TDD mode when the number of the UE's reception antennas is greater than the number of transmission ports and the number of downlink configuration ports is greater than 2; in addition, it can also overcome the problem that the eNodeB is hard to obtain conditions of radio channels completely from all the UE's antennas to the eNode in the LTE/LTE-A system when the number of antennas which can be used by the UE for transmission is greater than the number of transmission ports, so that the PUSCH cannot be transmitted through the optimal antenna or antenna group. If the beamforming method is used, it can further overcome the quantization error exists in a codebook, precisely match the channels, and improve the downlink performance.

What is claimed is:

1. A multi-antenna signal transmission method, wherein the method comprises:
   an evolved Node B (eNodeB) determining new sounding reference signal (SRS) transmission port information of UE according to the maximum number of reception antennas of the UE or the maximum number of antennas which can be used for transmission;
   the eNodeB sending the user equipment (UE) a SRS transmission mode as well as a control signaling required by the SRS transmission mode, wherein the SRS transmission mode comprises the new SRS transmission port information of the UE according to the maximum number of UE's reception antennas or the maximum number of antennas which can be used for transmission based on the determination and a signaling for instructing the UE to perform an antenna group alternate transmission;
   the eNodeB receiving a SRS sent by the UE using the SRS transmission mode according to the control signaling, and the eNodeB estimating channel information between the eNodeB and the UE according to the SRS;
   the eNodeB performing a downlink multiple-input multiple-output (MIMO) precoding matrix calculation and transmission according to the channel information; or the eNodeB performing a PUSCH antenna group selection and an uplink MIMO precoding matrix calculation and transmission according to the channel information and the UE performing an uplink MIMO signal transmission in a PUSCH antenna group selected by the eNodeB.

2. The method of claim 1, wherein the method further comprises:
   when the purpose of the UE transmitting the SRS is for a downlink beamforming of the eNodeB, the eNodeB determining the number of new SRS transmission ports according to the maximum number of the UE's reception antennas;
   when the purpose of the UE transmitting the SRS is for the UE's PUSCH antenna group selection and uplink MIMO signal transmission, the eNodeB determining the number of new SRS transmission ports according to the maximum number of antennas which can be used by the UE for transmission.

3. The method of claim 2, wherein,
   the step for determining the number of new SRS transmission ports according to the maximum number of the UE's reception antennas comprises making the sum of the number of the new SRS transmission ports and the number of long term evolution advanced (LTE-A) standard SRS transmission ports be the maximum number of the UE's reception antennas;
   the step of determining the number of new SRS transmission ports according to the maximum number of antennas which can be used by the UE for transmission comprises making the sum of the number of new SRS transmission ports and the number of LTE-A standard SRS transmission ports be the maximum number of antennas which can be used by the UE for transmission.

4. The method of claim 1, wherein,
   the new SRS transmission ports are orthogonal with LTE-A SRS transmission ports of the UE through time division, frequency division, or code division.

5. The method of claim 1,
   further comprising a signaling for indicating an antenna grouping principle, wherein the antenna grouping principle is grouping antennas whose antenna correlation is greater than or equal to a standard correlation into a same antenna group.

6. The method of claim 1, wherein,
   when the number of antenna groups which are used for performing the antenna group alternate transmission is more than one, the numbers of times of various antenna groups transmitting the SRS in one SRS transmission cycle are the same,
   or,
   when the number of antenna groups which are used for performing the antenna group alternate transmission is 2, the eNodeB uses a SRS antenna port serial number in a SRS antenna alternate transmission rule to indicate serial numbers of antenna group,
   or,
   the antenna group division method is determined according to whether the UE needs to perform a PUSCH antenna group selection and transmission or not, and when the UE needs to perform the PUSCH antenna group selection, antennas whose antenna correlation is greater than or equal to a standard correlation are grouped into a same antenna group, and when the UE does not need to perform the PUSCH antenna group selection, antennas whose antenna correlation is less than the standard correlation are grouped into a same antenna group.

7. The method of claim 1, wherein,
   after the eNode B receives the SRS, a corresponding channel estimation matrix of each LTE-A standard SRS transmission port number is obtained in accordance with an arrangement of LTE-A standard SRS port number of the UE, and a corresponding channel estimation matrix of each new SRS transmission port number is obtained in accordance with an arrangement of new SRS port number of the UE, and the two channel estimation matrixes are arranged into one matrix as a channel estimation matrix of all SRS transmission ports of the UE, and the channel information is estimated according to the matrix,
   after receiving the SRS, the eNodeB obtains channel estimation matrixes of SRS transmission ports of respective antenna groups in accordance with an arrangement of SRS transmission port number of the UE, arranges channel estimation matrixes of all antenna groups in accordance with an arrangement of antenna group serial number into one matrix as the channel estimation matrix of all SRS transmission ports of the UE, and estimates the channel information according to that matrix.

8. A user equipment (UE) terminal, wherein
the terminal comprises a receiving module, an analysis processing module, and a transmitting module;
the receiving module is configured to: receive a SRS transmission mode as well as a control signaling required by the SRS transmission mode from an eNodeB, wherein the SRS transmission mode comprises new SRS transmission port information of UE determined according to the maximum number of reception antennas of the UE or the maximum number of antennas which can be used for transmission and a signaling for instructing the UE to perform an antenna group alternate transmission; and receive a downlink MIMO precoding matrix signal or receive a PUSCH antenna group instructed by the eNodeB as well as an uplink MIMO pre-coding matrix signal;
the analysis processing module is configured to: analyze the control signaling and the SRS transmission mode;
the transmitting module is configured to: send the eNodeB the maximum number of reception antennas of UE and the maximum number of antennas which can be used for transmission, and use the SRS transmission mode to transmit a SRS according to the control signaling; and perform an uplink MIMO signal transmission in a PUSCH antenna group selected by the eNodeB.

9. The terminal of claim 8, wherein
the transmitting module is configured to transmit the SRS in a following way: when the number of antenna groups used for performing the antenna group alternate transmission is greater than 1, transmit the SRS for the same number of times in each antenna group in one SRS transmission cycle,
or,
the analysis processing module is further configured to: determine an antenna group division method according to whether the UE needs to perform a physical uplink shared channel (PUSCH) antenna group selection and transmission or not, and when there is a need to perform the PUSCH antenna group selection, group antennas whose antenna correlation is greater than or equal to a standard correlation into a same antenna group, and when there is no need to perform the PUSCH antenna group selection, group antennas whose antenna correlation is less than the standard correlation into a same antenna group.

10. A base station, wherein,
the base station comprises an analysis processing module and a transmitting module;
the analysis processing module is configured to: determine new SRS transmission port information of UE according to the maximum number of reception antennas of the UE or the maximum number of antennas which can be used for transmission, and determine a signaling for instructing the UE to perform an antenna group alternate transmission; and further used to estimate channel information between the base station and the UE according to a SRS; and perform a downlink MIMO pre-coding matrix calculation according to the channel information; and further used to perform a PUSCH antenna group selection and an uplink MIMO pre-coding matrix calculation according to the channel information;
the transmitting module is configured to: send the UE a SRS transmission mode and a control signaling required by the SRS transmission mode, wherein the SRS transmission mode comprises the new SRS transmission port information and a signaling used for instructing the UE to perform an antenna group alternate transmission; and transmit a downlink MIMO precoding matrix to the UE or transmit a PUSCH antenna group selection result and an uplink MIMO pre-coding matrix to the UE;
the receiving module is further configured to receive a sounding reference signal (SRS) transmitted by the UE.

11. The base station of claim 10, wherein,
the analysis processing module comprises a SRS transmission port determining unit;
the SRS transmission port determining unit is configured to: when the purpose of the UE transmitting the SRS is for downlink beamforming of the eNodeB, determine the number of the new SRS transmission ports according to the maximum number of reception antennas of the UE; and when the purpose of the UE transmitting the SRS is for PUSCH antenna group selection of the UE and uplink MIMO signal transmission, determine the number of the new SRS transmission ports according to the maximum number of antennas which can be used by the UE for transmission.

12. The base station of claim 11, wherein,
the SRS transmission port determining unit is configured to: when determining the number of the new SRS transmission ports according to the maximum number of reception antennas of the UE, make the sum of the number of the new SRS transmission ports and the number of long term evolution advanced (LTE-A) standard SRS transmission ports be the maximum number of reception antennas of the UE;
and when determining the number of the new SRS transmission ports according to the maximum number of antennas which can be used by the UE for transmission, make the sum of the number of the new SRS transmission ports and the number of LTE-A standard SRS transmission ports be the maximum number of antennas which can be used by the UE for transmission,
or,
the SRS transmission port determining unit is configured to: set the new SRS transmission ports to be orthogonal with LTE-A standard SRS transmission ports of the UE through time division, frequency division, or code division.

13. The base station of claim 10
further comprising a signaling for indicating an antenna grouping principle, wherein the antenna grouping principle is grouping antennas whose antenna correlation is greater than or equal to a standard correlation into a same antenna group,
or,
the analysis processing module further comprises an antenna group alternate transmission setting unit,
and the antenna group alternate transmission setting unit is configured to: perform an alternate transmission rule of SRS antenna port during antenna alternate transmission, and when the number of antenna groups used for performing the antenna group alternate transmission is 2, use a SRS antenna port serial number in a SRS antenna alternate transmission rule to indicate serial numbers of antenna group.

14. The base station of claim 10, wherein,
the analysis processing module further comprises a channel estimation unit;
the channel estimation unit is configured to: obtain a corresponding channel estimation matrix of each LTE-A standard SRS transmission port number in accordance with an arrangement of LTE-A standard SRS port number of the UE, obtain a corresponding channel estimation matrix of each new SRS transmission port number in accordance with an arrangement of new SRS port number of the UE, and arrange the two channel estimation matrixes into one matrix as a channel estimation matrix of all SRS transmission ports of the UE, and estimate the channel information according to the matrix, or, the channel estimation unit is configured to: obtain channel estimation matrixes of SRS transmission ports of respective antenna groups according to an arrangement of SRS transmission port number of the UE, arrange channel estimation matrixes of all antenna groups into one matrix as a channel estimation antenna of all SRS transmission ports of the UE in accordance with an arrangement of antenna group serial number, and estimate the channel information according to the matrix.

* * * * *